(12) United States Patent
Masuda

(10) Patent No.: US 9,753,125 B2
(45) Date of Patent: Sep. 5, 2017

(54) DISTANCE MEASURING APPARATUS USING LASER LIGHT

(71) Applicant: Makoto Masuda, Nara (JP)

(72) Inventor: Makoto Masuda, Nara (JP)

(*) Notice: Subject to any disclaimer, the term of this patent is extended or adjusted under 35 U.S.C. 154(b) by 406 days.

(21) Appl. No.: 14/516,863

(22) Filed: Oct. 17, 2014

(65) Prior Publication Data

US 2015/0109604 A1 Apr. 23, 2015

(30) Foreign Application Priority Data

Oct. 18, 2013 (JP) .................... 2013-217045

(51) Int. Cl.
| | | |
|---|---|---|
| *G01C 3/08* | (2006.01) | |
| *G01S 7/484* | (2006.01) | |
| *G01S 17/42* | (2006.01) | |
| *G01S 7/481* | (2006.01) | |
| *G01S 7/497* | (2006.01) | |

(52) U.S. Cl.
CPC ............ *G01S 7/484* (2013.01); *G01S 7/4814* (2013.01); *G01S 7/4817* (2013.01); *G01S 7/497* (2013.01); *G01S 17/42* (2013.01)

(58) Field of Classification Search
CPC ...... G01S 7/484; G01S 7/4817; G01S 7/4814; G01S 17/42
USPC ........................................................ 356/5.01
See application file for complete search history.

(56) References Cited

U.S. PATENT DOCUMENTS

| | | | | |
|---|---|---|---|---|
| 6,529,280 B1 * | 3/2003 | Yahashi | ............ | G01B 11/2518 356/602 |
| 7,817,176 B2 * | 10/2010 | Masuda | .................. | B41J 2/471 347/129 |

FOREIGN PATENT DOCUMENTS

| | | |
|---|---|---|
| JP | H063617 A | 1/1994 |
| JP | 2005107097 A | 4/2005 |
| JP | 2009270937 A | 11/2009 |
| JP | 2012-141265 A | 7/2012 |

OTHER PUBLICATIONS

Japanese Notice of Reasons for Rejection corresponding to Application No. JP2013-217045; Mailing date: Nov. 4, 2015, with English translation.

* cited by examiner

*Primary Examiner* — Mark Hellner
(74) *Attorney, Agent, or Firm* — Cantor Colburn LLP

(57) ABSTRACT

The distance measuring apparatus 1 using laser light includes: a laser light source 2; a first optical element 3 that converts laser light R1 emitted from the laser light source 2 into collimated light; a light deflecting device 6 that includes an oscillating mirror 9 and scans the laser light on a surface of an object to be measured 4; a varifocal lens 7 that is arranged between the first optical element 3 and the light deflecting device 6 and converges scanning laser light R2 scanned by the light deflecting device 6 on the surface of a measurement part 5; and a light quantity detector 8 that detects a maximum value of a light quantity of reflected light reflected off the surface of the measurement part 5.

4 Claims, 10 Drawing Sheets

DISTANCE MEASURING APPARATUS USING LASER LIGHT

CROSS REFERENCE TO RELATED APPLICATION

This application is based upon and claims the benefit of priority from Japanese patent application No. 2013-217045, filed on Oct. 18, 2013, the disclosure of which is incorporated herein in its entirety by reference.

TECHNICAL FIELD

The present invention relates to a distance measuring apparatus using laser light.

BACKGROUND ART

JP 2012-141265 A discloses a distance measuring apparatus using scanning laser light that projects and scans laser light from a laser light source toward the surface of an object to be measured using a galvanometer mirror as a light deflecting device at preliminarily set light projection timing and detects reflected light that is scanned on and reflected off the surface of the object to be measured by a light receiving part. The distance measuring apparatus is to measure the distance to the surface of the object to be measured on the basis of a time difference between the light projection timing of the laser light source and the light receiving timing of the reflected light by the light receiving part.

SUMMARY OF INVENTION

Technical Problem

The distance measuring apparatus disclosed in JP 2012-141265 A is to measure the distance to the surface of the object to be measured on the basis of the time difference between the light projection timing and the light receiving timing of the reflected light. However, when the distance between the laser light source and the surface of the object to be measured is short, measurement in a very short time is required. Therefore, many components including a very high-precision time measuring apparatus are required for the time measurement, so that it is difficult to downsize the distance measuring apparatus.

The present invention has been made in consideration of the problem, and its object is to provide a small and high-precision distance measuring apparatus.

Solution to Problem

To solve the above problem, the present invention is a distance measuring apparatus using laser light, including: a laser light source; a first optical element that converts laser light emitted from the laser light source into collimated light; a light deflecting device that includes an oscillatable mirror and scans the laser light on a surface of an object to be measured; a second optical element that is arranged between the first optical element and the light deflecting device and converges scanning laser light scanned by the light deflecting device on the surface of the object to be measured; and a light quantity detector that detects a maximum value of a light quantity of reflected light reflected off the surface of the object to be measured.

In addition to the above invention, it is preferable to configure the distance measuring apparatus using laser light such that a light quantity value of the reflected light is detected in advance or at a time of measurement by the light quantity detector while a focal distance of the second optical element is being varied, and stored, and parameters relating to a scan position of the scanning laser light at that time and the focal distance of the second optical element are associated and stored, and that the scanning laser light is scanned, the maximum value of the light quantity of the reflected light is detected while the focal distance of the second optical element is being varied at each scan position, and a distance from the mirror to the object to be measured is calculated using the maximum light quantity value of the light quantity and the parameters.

Further, in addition to the above invention, it is preferable that driving timing of the light deflecting device and driving timing of the second optical element are synchronized.

Further, in addition to the above invention, it is preferable that the second optical element is a varifocal lens whose focal distance varies depending on voltage to be applied thereto.

Further, in addition to the above invention, it is preferable that the light deflecting device is a MEMS structure of an electrostatically driving method that oscillates the mirror.

Further, in addition to the above invention, it is preferable to further include an optical path branching device that is provided between the mirror and the first optical element and guides the reflected light to the light quantity detector.

DESCRIPTION OF EMBODIMENTS

Figure 1:
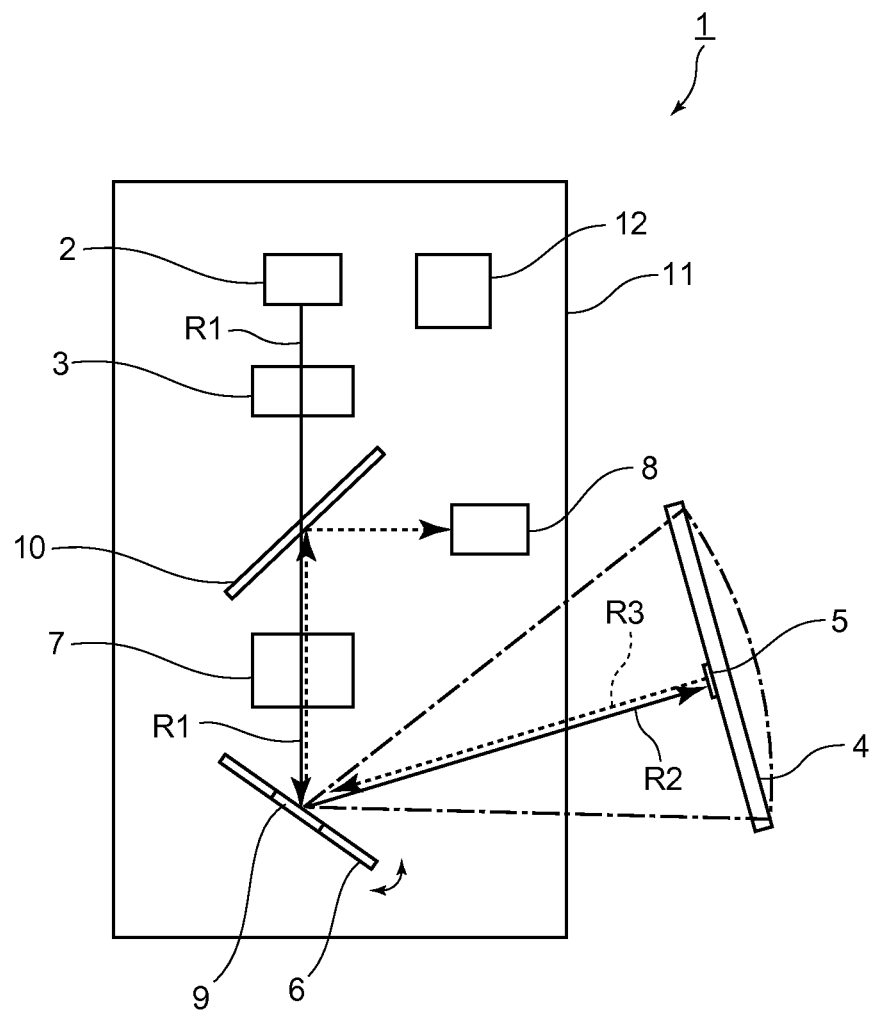
FIG. 1 is a block diagram illustrating a configuration of a distance measuring apparatus using laser light and an optical path according to an embodiment of the present invention.

Hereinafter, a distance measuring apparatus 1 using laser light according to an embodiment of the present invention will be described referring to the drawings.

(Configuration of Distance Measuring Apparatus 1 Using Laser Light)

FIG. 1 is a block diagram illustrating the configuration of the distance measuring apparatus 1 using laser light and an optical path according to this embodiment. Note that the distance measuring apparatus 1 using laser light is described, expressed simply as a distance measuring apparatus 1 in the following explanation. The distance measuring apparatus 1 includes a laser light source 2 such as a laser diode (semiconductor laser), a first optical element 3 that converts laser light R1 emitted from the laser light source 2 into collimated light, and a light deflecting device 6 that deflects and scans the laser light R toward an object to be measured 4 and a measurement part 5. The distance measuring apparatus 1 further includes a second optical element 7 that is arranged between the first optical element 3 and the light deflecting device 6 and converges (focuses) scanning laser light R2 scanned by the light deflecting device 6 on the surface of the measurement part 5 of the object to be measured 4, and a light quantity detector 8 that detects the light quantity of reflected light R3 reflected off the surface of the measurement part 5. Further, the light deflecting device 6 includes an oscillating mirror 9 capable of oscillating. Further, on the optical path of the laser light R1 between the first optical element 3 and the oscillating mirror 9, a half mirror 10 is provided as an optical branching device that branches the reflected light R3 and guides it to the light quantity detector 8.

Optical system elements such as the above-described laser light source 2, first optical element 3, light deflecting device 6, second optical element 7, light quantity detector 8, and half mirror 10 are stored in a housing 11. A side surface of the housing 11 is formed with an opening (not illustrated) allowing the scanning laser light R2 to be scanned in a predetermined range. Note that the distance measuring apparatus 1 includes a control unit 12 that controls the above-described optical system elements.

The first optical element 3 is an optical element that converts the laser light R1 emitted from the laser light source 2 into the collimated light, and a collimator lens or the like is used in this embodiment. Further, the light deflecting device 6 is a MEMS structure of an electrostatically driving method including the oscillating mirror 9. In this embodiment, a varifocal lens whose focal distance can be arbitrarily varied is exemplified as the second optical element 7. Accordingly, the second optical element 7 is expressed as a varifocal lens 7 in the following explanation. The structure of the light deflecting device 6 will be described later referring to FIG. 3, and the structure of the second optical element 7 will be described later referring to FIG. 5.

Here, optical paths of the laser right R1 and the reflected light R3 will be described referring to FIG. 1. The laser light R1 emitted from the laser light source 2 is converted by the first optical element 3 into the collimated light. The laser light R1 converted into the collimated light passes through the half mirror 10 and the second optical element 7 and is applied to the oscillating mirror 9 of the light deflecting device 6. Then, the oscillating mirror 9 is oscillated to scan and apply the laser light in a measurement target region including the object to be measured 4. Note that the scanned laser light is expressed as the scanning laser light R2. The applied scanning laser light R2 is reflected off the surface of the measurement part 5. Driving timing of the light deflecting device 6 and driving timing of the second optical element 7 are synchronized. Therefore, the reflected light R3 has a light diameter narrowed at each position of the object to be measured 4 where the laser light is applied. The reflected light R3 inversely follows the optical path reaching the oscillating mirror 9 from the laser light source 2, and is optically branched off this optical path at the half mirror 10 and is guided to the light quantity detector 8. Note that the light quantity detector 8 is, for example, a light receiving element such as a photodiode and detects the light quantity of the reflected light R3.

The distance measuring apparatus 1 in this embodiment utilizes the fact that the reflected light quantity becomes maximum at a position where the scanning laser light R2 is converged on the surface of the measurement part 5 (position where the scanning laser light R2 is focused), and a scan position of the laser light by driving the oscillating mirror 9 and a focal distance by the second optical element 7 are controlled by the control unit 12. Subsequently, the configuration of the control unit 12 of the distance measuring apparatus 1 will be described referring to FIG. 2.

Figure 2:
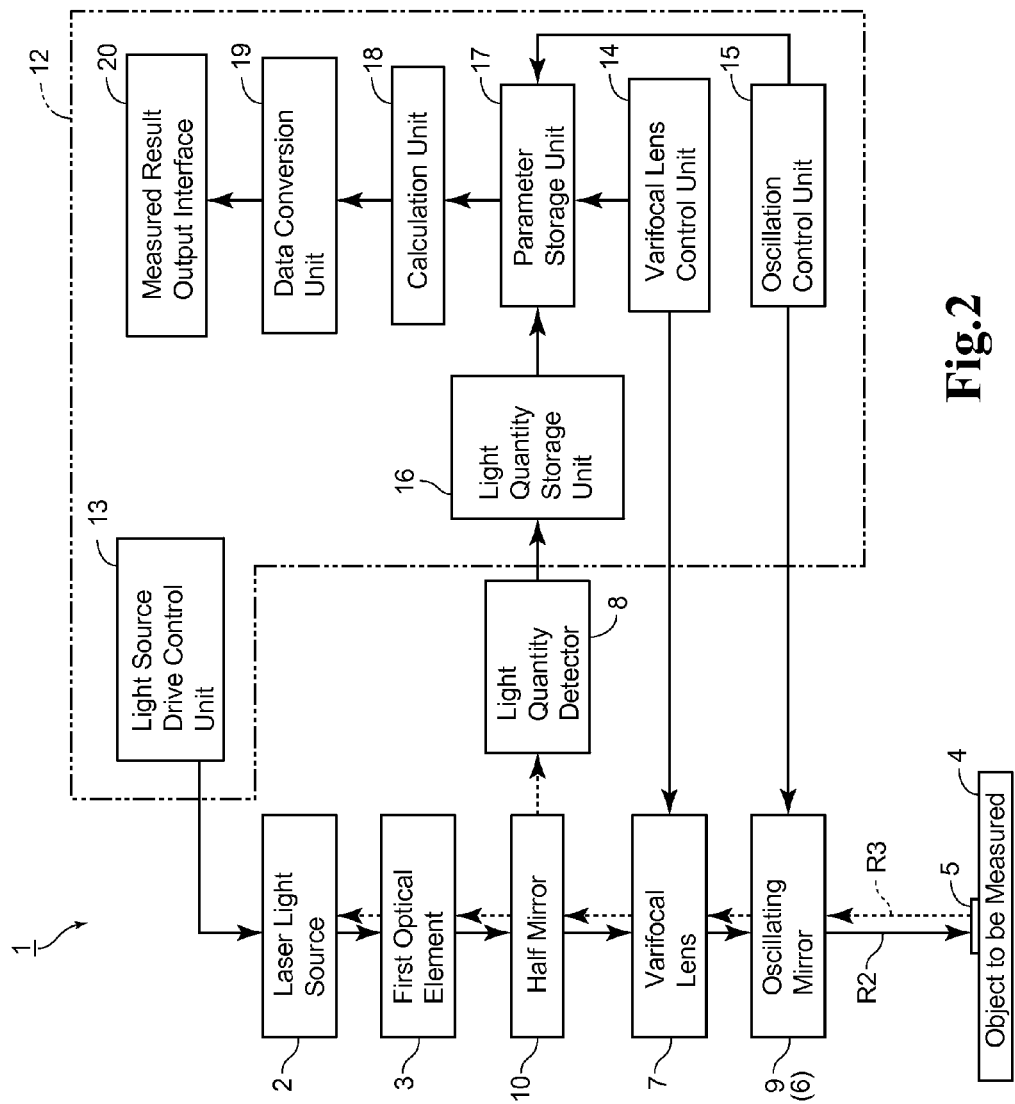
FIG. 2 is a block diagram illustrating a main configuration of a control unit according to the embodiment of the present invention.

FIG. 2 is a block diagram illustrating the main configuration of the control unit 12 according to this embodiment. The configurations of the optical system elements illustrated on the left side in the block diagram have been described with FIG. 1, and therefore description thereof will be omitted here. The control unit 12 includes a light source drive control unit 13 that controls driving of the laser light source 2, a varifocal lens control unit 14 that controls the focal distance of the varifocal lens 7, an oscillation control unit 15 that controls driving of the oscillating mirror 9, and a light quantity storage unit 16 that stores the detected light quantity of the reflected light R3. The light source drive control unit 13 controls output of the laser light source 2 and emission timing of the laser light R1. The varifocal lens control unit 14 controls a voltage to be applied to the varifocal lens 7 to control the convergence position (focal position) of the scanning laser light R2. When the focal position is located on the surface of the measurement part 5, most of the reflected light R3 is reflected so that the detected light quantity becomes maximum.

The oscillation control unit 15 controls the oscillation direction, the oscillation angle and the oscillation timing of the oscillating mirror 9 to acquire scan position information of the scanning laser light R2 while controlling the scan direction and the scanning speed of the scanning laser light R2. Driving timings of the light source drive control unit 13, the varifocal lens control unit 14, and the oscillation control unit 15 are synchronized. In other words, the emission timing of the laser light R1 from the laser light source 2, the scanning timing by the light deflecting device 6, and the driving timing of the second optical element 7 are synchronized. Accordingly, the reflected light R3 can follow the optical path directing from the laser light source 2 to the oscillating mirror 9 to be optically branched off by the half mirror 10, and can be received by the light quantity detector 8 as the reflected light of the scanning laser light R2 emitted to a predetermined position. Information on the detected value of the maximum light quantity of light quantities detected by the light quantity detector 8 is stored in the light quantity storage unit 16.

The control unit 12 further includes a parameter storage unit 17 that stores scanning information of the scanning laser light R2, control information (information for controlling the focal distance) of the varifocal lens control unit 14, and the maximum light quantity detected value of the reflected light in association. The control unit 12 further includes a calculation unit 18 that calculates the distance from the oscillating mirror 9 to the surface of the measurement part 5 using the information in the parameter storage unit 17, and inputs the distance information into a data conversion unit 19.

The data conversion unit 19 associates the scan position information and the distance information to convert them into matrix information. However, how to output the distance information can be made to correspond to the method of using data. For example, it is possible to output the distance information as a list of the scan position (detection position of the maximum light quantity) and the distance, output the distance information after converting it into a three-dimensional image on the basis of the data, or output the distance information after performing data conversion on it to a position where the distance from the oscillating mirror 9 to the surface of the measurement part 5 becomes maximum or minimum. Then, the converted data is outputted to a measured result output interface 20. Note that the measured result output interface 20 may be disposed at a position away from the distance measuring apparatus 1, and the converted data can also be transmitted from the data conversion unit 18 to a PC (personal computer) or a portable terminal using a communication unit.

(Configuration of Light Deflecting Device 6)

Figure 3:
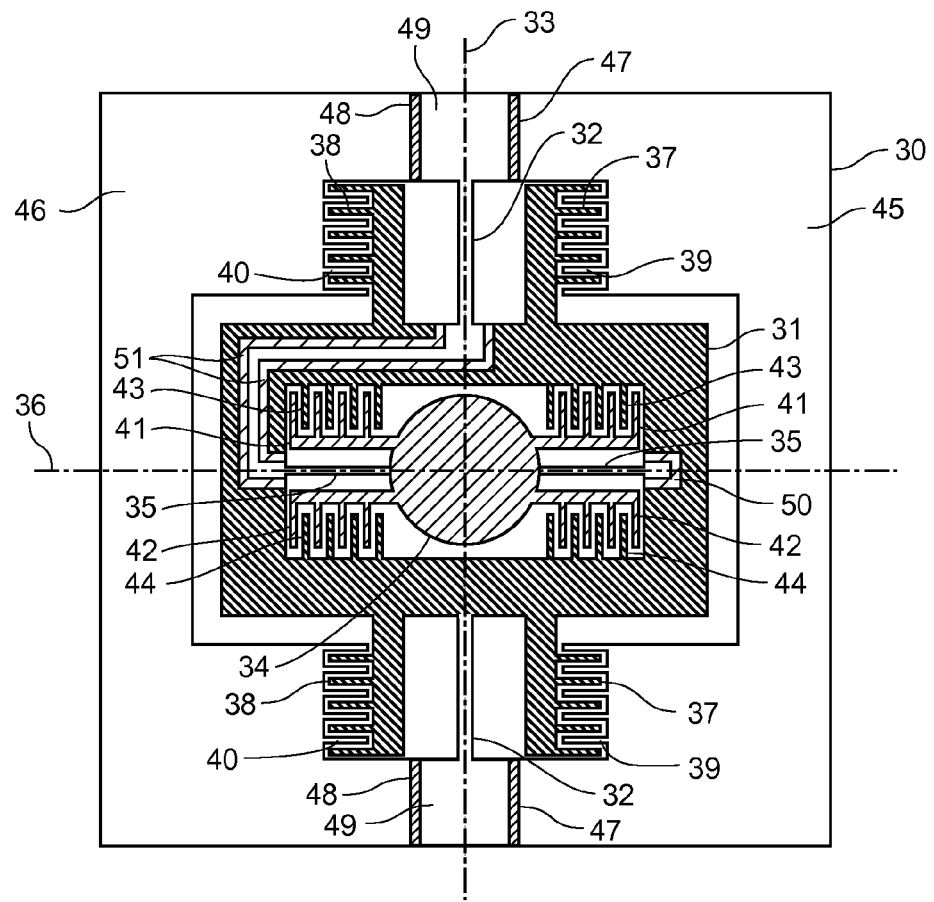
FIG. 3 is a plan view illustrating an example of a configuration of a light deflecting device according to the embodiment of the present invention.
Figure 3:
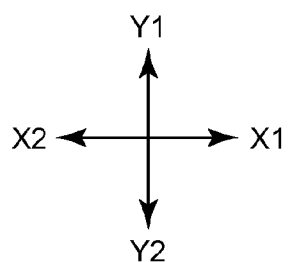

FIG. 3 is a plan view illustrating an example of a configuration of the light deflecting device 6 according to this embodiment. The light deflecting device 6 illustrated in FIG. 3 illustrates an example of the configuration in which the oscillating mirror 9 can two-dimensionally oscillate. Note that description will be made while the horizontal direction in the drawing is expressed as an X-direction and a longitudinal direction perpendicular to the X-direction is expressed as a Y-direction. The light deflecting device 6 is an actuator of the electrostatically driving method, and is a MEMS (Micro Electro Mechanical Systems) structure in which a fixed part, a movable part, and a conductive layer are formed on a base substrate 30 using a semiconductor manufacturing technique. The base substrate 30 is formed of a rectangular silicon substrate (semiconductor substrate) with a uniform thickness. At a central portion of the base substrate 30, a frame 31 is formed, and the frame 31 is connected to the base substrate 30 only by first torsion bars 32 at both sides in the Y-direction. The first torsion bars 32 are arranged at the middle portion in the X-direction of the frame 31, and the middle portion in the X-direction of the first torsion bars 32 is a first rotation axis 33 of the frame 31 with respect to the base substrate 30.

A circular movable part 34 is formed at the center portion of the frame 31, and the movable part 34 is connected to the frame 31 only by second torsion bars 35 on both sides in the X-direction. The second torsion bars 35 are arranged at the middle portion in the Y-direction of the movable part 34, and the middle portion in the Y-direction of the second torsion bars 35 is a second rotation axis 36 of the movable part 34 with respect to the base substrate 30. Note that the second rotation axis 36 is also a rotation axis with respect to the frame 31. The surface of the movable part 34 is subjected to mirror finish to form into the oscillating mirror 9. The surface of the oscillating mirror 9 may be structured such that a reflection film such as aluminum is provided to increase reflectance of light.

The frame 31 is provided with a first comb-teeth electrode 37, and the first comb-teeth electrode 37 has an array toward a Y1-direction at a region on the side closer to an X1-direction than is the first torsion bar 32. The first comb-teeth electrode 37 is extended in the X1-direction. A second comb-teeth electrode 38 symmetrical to the first comb-teeth electrode 37 across the first rotation axis 33 is formed on an X2-direction side of the first torsion bar 32. On the other hand, a first comb-teeth electrode 37 and a second comb-teeth electrode 38 symmetrical to the comb-teeth electrode 37 and the second comb-teeth electrode 38 on the Y1 side across the second rotation axis 36 are formed on a Y2-direction side of the frame 31.

The base substrate 30 is formed with a third comb-teeth electrode 39 inserted in the already-described first comb-teeth electrode 37 and a fourth comb-teeth electrode 40 inserted in the second comb-teeth electrode 38. Between the first comb-teeth electrode 37 and the third comb-teeth electrode 39 and between the second comb-teeth electrode 38 and the fourth comb-teeth electrode 40, a fixed gap is provided.

The movable part 34 is provided with a fifth comb-teeth electrode 41, and the fifth comb-teeth electrode 41 has an array toward the X1-direction at a region on the side closer to the Y1-direction than is the second torsion bar 35. The fifth comb-teeth electrode 41 is extended in the Y1-direction. A sixth comb-teeth electrode 42 symmetrical to the fifth comb-teeth electrode 41 across the second rotation axis 36 is formed on the Y2-direction side of the second torsion bar 35. On the other hand, a fifth comb-teeth electrode 41 and a sixth comb-teeth electrode 42 symmetrical to the fifth comb-teeth electrode 41 and the sixth comb-teeth electrode 42 on the X1 side with respect to the first rotation axis 33 are formed on the X2-direction side of the movable part 34.

The frame 31 is formed with a seventh comb-teeth electrode 43 inserted in the already-described fifth comb-teeth electrode 41 and an eighth comb-teeth electrode 44 inserted in the sixth comb-teeth electrode 42. Between the fifth comb-teeth electrode 41 and the seventh comb-teeth electrode 43 and between the sixth comb-teeth electrode 42 and the eighth comb-teeth electrode 44, a fixed gap is provided. On the surfaces (the surfaces on the illustrated side) of the first comb-teeth electrode 37 to the eighth comb-teeth electrode 44, not-illustrated conductive layers are formed.

Note that grooves 47 and grooves 48 that divide the base substrate 30 to a right side region 45 and a left side region 46 are formed on both sides in the X-direction of the first torsion bars 32 at a Y1-direction end portion and a Y2-direction end portion of the base substrate 30. A region surrounded by the two grooves 47, 48 is a connection region 49. On the other hand, the frame 31 is formed with a groove 50 that electrically divides a connection part between the torsion bar 35 on the right side and the frame 31, and a groove 51 that divides a connection part between the second torsion bar 35 on the left side and the frame 31. As described above, the light deflecting device 6 is electrically divided into four regions by the grooves 47, 48, 50, 51 to make it possible to supply power at different potential to each of them.

(Driving Method of Oscillating Mirror 9)

First, the oscillation around the first rotation axis 33 will be described. When power at different potential is supplied to each of the right side region 45 and the left side region 46 of the base substrate 30, an electric field is generated between the comb-teeth electrodes inserted in each other. For example, assuming that attraction force acts between the first comb-teeth electrodes 37 and the third comb-teeth electrodes 39 on the right side region 45 side, the first torsion bars 32 are twisted and the frame 31 including the oscillating mirror 9 and the movable part 34 rotates around the first rotation axis 33 as a rotation axis. When the oscillating mirror 9 being the surface finished as a mirror surface of the movable part 34 is viewed from the Y2-direction, the oscillating mirror 9 rotates clockwise.

In contrast, when power is supplied to cause repulsive force to act between the first comb-teeth electrodes 37 and the third comb-teeth electrodes 39 on the right side region 45 side, the oscillating mirror 9 rotates counterclockwise. A rotation angle (oscillation angle) at that time can be controlled by the supply voltage, and the voltage value and the voltage application timing are controlled by the oscillation control unit 15.

Assuming here that the X-direction illustrated in FIG. 3 is the horizontal direction, the oscillating mirror 9 is oscillated around the first rotation axis 33 as its rotation axis and becomes to be able to scan the scanning laser light R2 to reciprocate in the horizontal direction. The frame 31 can be said to be a movable part with respect to the base substrate 30. Further, the oscillating mirror 9 is configured such that the scan direction (oscillation is clockwise or counterclockwise), the oscillation angle, and the oscillation speed in the horizontal direction (X-direction) can be controlled by the oscillation control unit 15.

Next, the oscillation of the oscillating mirror 9 around the second rotation axis 36 will be described. On the surfaces of the second torsion bars 35 that connect the movable part 34 and the frame 31, not-illustrated conductive layers are formed. Further, the movable part 34, the second torsion bars 35, the fifth comb-teeth electrodes 41, and the sixth comb-teeth electrodes 42 are at the same potential.

When power at different potential is supplied to each of the Y1-direction side and the Y2-direction side of the second rotation axis 36 of the frame 31, an electric field is generated between the comb-teeth electrodes inserted in each other. For example, assuming that attraction force acts between the seventh comb-teeth electrodes 43 and the fifth comb-teeth electrodes 41 in the Y1-direction side region, the second torsion bars 35 are twisted and the oscillating mirror 9 rotates with respect to the frame 31 around the second rotation axis 36 as a rotation axis. When the oscillating mirror 9 is viewed from the X2-direction, the oscillating mirror 9 rotates counterclockwise.

In contrast, when power is supplied to cause repulsive force to act between the seventh comb-teeth electrode 43 and the eighth comb-teeth electrode 44 on the Y1-direction side, the oscillating mirror 9 rotates clockwise as viewed from the X2 side. Since the second rotation axis 36 is perpendicular to the first rotation axis 33, the oscillating mirror 9 will oscillate around the second rotation axis 36 as a pivot center. Further, the oscillating mirror 9 is configured such that the scan direction (oscillation is clockwise or counterclockwise), the oscillation angle, and the oscillation speed in the vertical direction (Y-direction) can be controlled by the oscillation control unit 15, similarly to the already-described scanning (oscillation) in the horizontal direction.

As described above, the light deflecting device 6 in this embodiment uses the actuator of the electrostatically driving method that oscillates the oscillating mirror 9 by the electric field generated between the comb-teeth electrodes inserted in each other, and enables two-dimensional driving in the horizontal direction and the vertical direction by relatively combining the scanning in the horizontal direction and the scanning in the vertical direction. Accordingly, the two-dimensional scanning of the scanning laser light R2 is possible. As the two-dimensional scanning, raster scanning illustrated in FIG. 4 and not-illustrated Lissajous scanning are possible.

Figure 4:
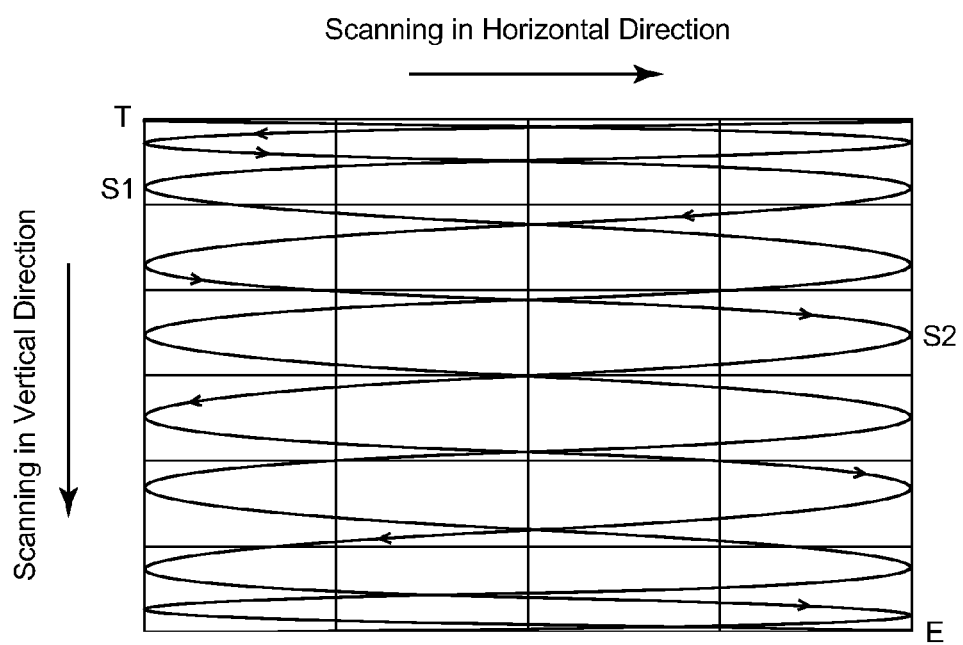
FIG. 4 is a view illustrating a scanning trajectory of scanning laser light according to the embodiment of the present invention.

FIG. 4 is a view illustrating a scanning trajectory of the scanning laser light R2. The scanning trajectory illustrated in FIG. 4 is an example of the raster scanning and illustrates a case where the ratio of the horizontal scanning to the vertical scanning is 10:1. The horizontal scanning and the vertical scanning are performed at a ratio of 10:1 from a scanning start position T while the scanning laser light R2 reciprocates between a left side scanning end portion S1 and a right side scanning end portion S2, and the scanning laser light R2 is scanned in the vertical direction to a scanning end position E and returned to the scanning start position T. This scan cycle is regarded as one scan cycle (or one measurement cycle). Alternatively, as illustrated in FIG. 4, the scanning indicated with an arrow in the drawing is performed from the scanning start position T to the scanning end position E and scanning of reciprocating between the left side scanning end portion S1 and the right side scanning end portion S2 from the scanning end position E to the scanning start position T so as to interpolate the scanning trajectory may be regarded as one scan cycle (or one measurement cycle).

(Structure of Second Optical Element 7)

Subsequently, the structure of the varifocal lens 7 as the second optical element will be described. The varifocal lens 7 is to vary the focal distance of the scanning laser light R2 incident from the first optical element 3 so as to uniform and minimize the beam spot diameter of the scanning laser light R2 on the plane to be scanned of the object to be measured 4.

Figure 5:
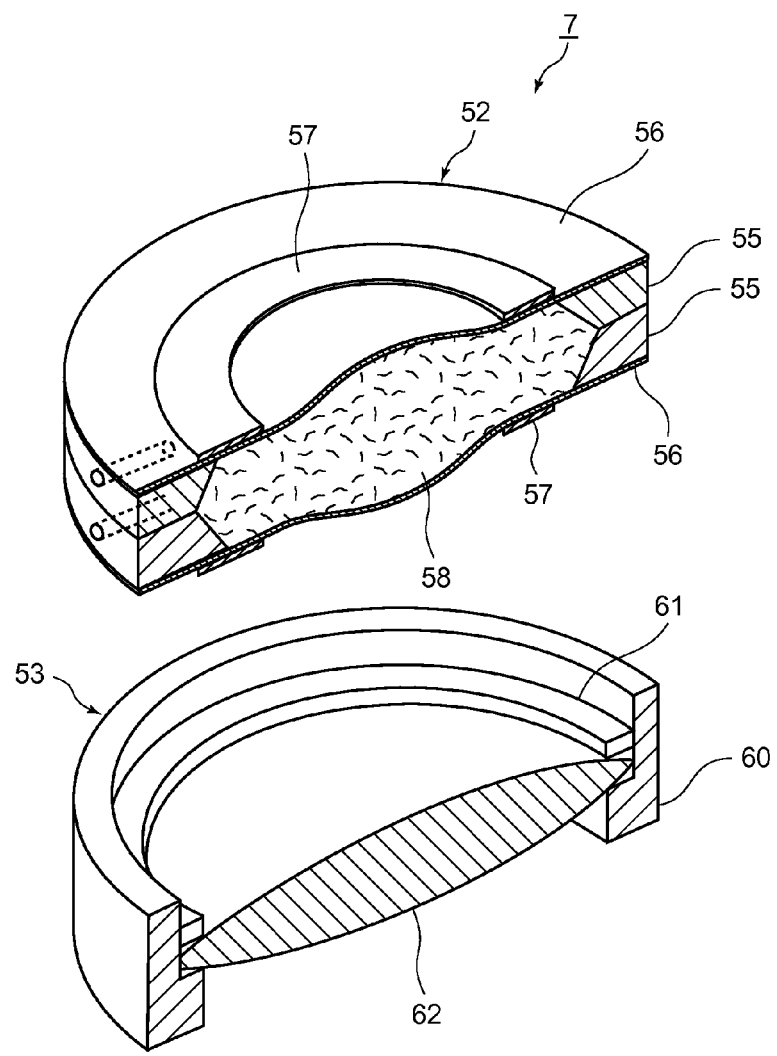
FIG. 5 is a perspective sectional view illustrating a structure of a varifocal lens according to the embodiment of the present invention.

FIG. 5 is a perspective sectional view illustrating the structure of the varifocal lens 7. The varifocal lens 7 is composed of a varifocal lens part 52 and a fixed lens part 53. The varifocal lens part 52 is configured by bonding light transmissive elastic films 56 on both sides in the thickness direction of annular spacers 55, 55 by a bonding means such as anodic bonding. The spacers 55, 55 are formed of silicon, and the light transmissive elastic films 56 are formed of thin-film glass diaphragms. As illustrated in FIG. 5, on the surface side of the light transmissive elastic film 56 on the upper side and on the surface side of the light transmissive elastic film 56 on the lower side, piezoelectric elements 57 of PZT (lead zirconia titanate) or the like are annularly formed by a deposition method such as sputtering. Central portions of the piezoelectric elements 57 are opening portions through which the scanning laser light R2 (including the reflected light R3) is transmitted.

The fixed lens part 53 is configured to be fixed by a fixing means such as adhesive bonding with a fixed objective lens 62 sandwiched between an inner peripheral stepped portion of a lens holder 60 and a holding ring 61. Further, the above-described varifocal lens part 52 and fixed lens part 53 are integrated together by their outer peripheral portions being bonded to each other by means of adhesive bonding or the like.

In a space formed by the two light transmissive elastic films 56 and the two spacers 55, a working fluid 58 is filled which is made of a light transmissive material. The varifocal lens 7 has, for example, a convex lens shape as a whole. In this embodiment, when voltage is applied to the piezoelectric elements 57, the piezoelectric elements 57 contract or expand according to the voltage value, and the shape of the working fluid 58 surrounded by the spacers 55 and the light transmissive elastic films 56 changes. The change of the shape varies the curvature of the light transmissive elastic films 56 to vary the focal distance of the varifocal lens 7. When the varifocal lens 7 is a convex lens and its radius of curvature becomes smaller, the focal distance becomes longer. Accordingly, it is possible to vary the focal distance of the varifocal lens 7 such that when gradually increasing the voltage to be applied to the piezoelectric elements 57, the focal distance becomes gradually longer (or shorter) according to the magnitude of the voltage. The varifocal lens 7 is configured to vary the focal distance of the scanning laser light R2 by synchronizing the driving of varifocal lens 7 with the oscillation of the oscillating mirror 9.

Note that the light transmissive elastic films 56 have a film thickness distribution such that the film thickness at the central portion becomes smaller than that at the outer peripheral portion. This makes it possible to reduce the optical aberration of the varifocal lens 7.

Note that the distance measuring apparatus 1 in this embodiment synchronizes the driving timing of the varifocal lens 7 with the oscillation driving timing of the oscillating mirror 9. The control of the focal distance by the varifocal lens 7 is performed so that the scanning laser light R2 emitted from the oscillating mirror 9 converges on the surface of the measurement part 4. If the scanning laser light R2 converges on the surface of the measurement part 5 (light is focused on the position), the light quantity of the reflected light from the object to be measured 5 becomes maximum. The distance measuring apparatus 1 according to this embodiment is an apparatus that utilizes the correlation between the focal distance of the varifocal lens 7, the maximum light quantity value detected by the light quantity detector 8, and the scan position of the scanning laser light R2.

Figure 6:
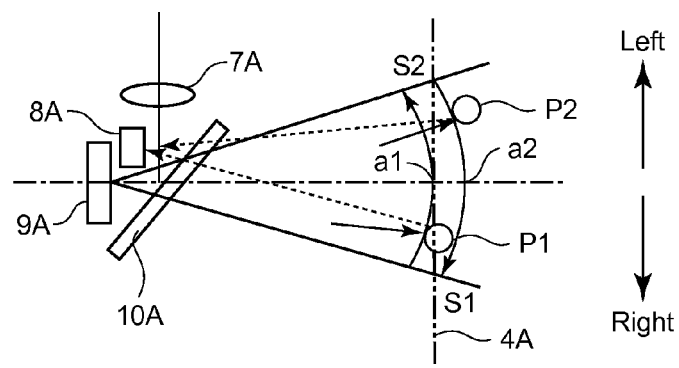
FIG. 6 is a view for explaining an example for synchronizing piezoelectric elements of the varifocal lens with oscillation of an oscillating mirror according to the embodiment of the present invention (a case where the varifocal lens is not operating)
Figure 7:
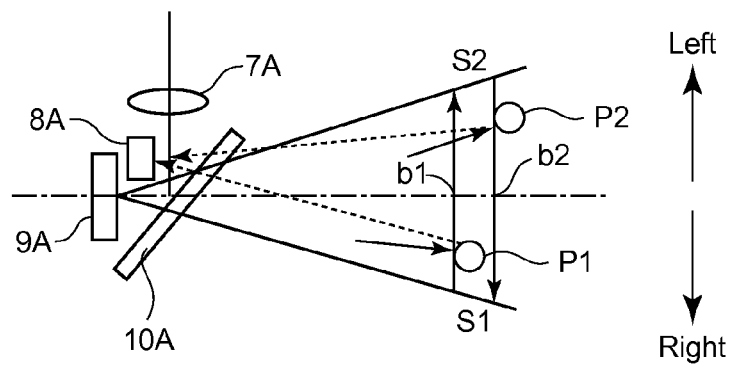
FIG. 7 is a view for explaining an example for synchronizing the piezoelectric elements of the varifocal lens with the oscillation of the oscillating mirror according to the embodiment of the present invention (a case where the varifocal lens is operating)
Figure 8:
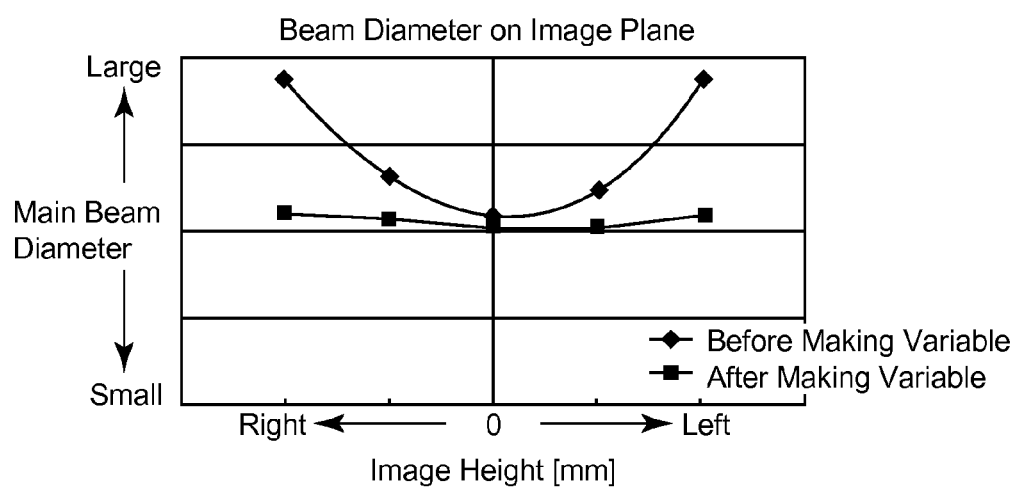
FIG. 8 is a graph illustrating changes in beam diameter before making variable and after making variable the focal distance of the varifocal lens according to the embodiment of the present invention.

Here, the adjustment of the focal distance of the varifocal lens 7 will be described referring to FIG. 6 to FIG. 8. FIG. 6 and FIG. 7 are views for explaining examples for synchronizing the driving of the piezoelectric elements 57 of the varifocal lens 7 with the oscillation of the oscillating mirror 9, and FIG. 6 is a view illustrating a case where a varifocal lens 7A is not operating and FIG. 7 is a view illustrating a case where the varifocal lens 7A is operating. Further, FIG. 8 is a graph illustrating changes in main beam diameter before making variable and after making variable the focal distance of the varifocal lens. The main beam diameter here means the diameter of a main luminous flux at the object to be measured 4 when the scanning laser light R2 is applied to the object to be measured 4. Note that the configuration illustrated in FIG. 6, FIG. 7 is different from that of the distance measuring apparatus 1 in FIG. 1, and is to find out how to synchronize the driving of the varifocal lens 7 with the oscillation of the oscillating mirror 9. Reference numerals are the same as those of the members of the distance measuring apparatus 1 and therefore "A" is added to the same numerals. Note that in FIG. 6, FIG. 7, a half mirror 10A is provided on an optical path between an oscillating mirror 9A and an object to be measured 4A, and a light quantity detector 8A that receives the reflected light R3 is arranged at a position different from that in the distance measuring apparatus 1 in FIG. 1. A spot P1 and a spot P2 indicated in FIG. 6, FIG. 7 schematically illustrate main beams on scan lines.

The scanning laser light R2 whose focal distance is decided by the varifocal lens 7A is reflected off the oscillating mirror 9A and scanned on a plane to be scanned, for example, the object to be measured 4A. As illustrated in FIG. 6, the collimated light from the first optical element 3 has a minimum beam diameter at a predetermined position by the varifocal lens 7A. In this example, when a voltage of 80 V is applied to the varifocal lens 7A, the focal distance of the lens becomes shortest and the beam diameter becomes minimum at a position of 30 cm from the varifocal lens 7A (position of a1 in the drawing). When a voltage of 75 V is applied to the varifocal lens 7A, the focal distance of the varifocal lens 7A becomes longer and the beam diameter becomes minimum at a position of 35 cm from the varifocal lens 7A (position of a2 in the drawing). As described above, the focal distance of the varifocal lens 7A can be arbitrarily set by the voltage applied thereto.

As illustrated in FIG. 6, when the oscillating mirror 9A is oscillated without applying voltage to the varifocal lens 7A (before making variable), the beam diameter becomes minimum at the center of the oscillation and becomes larger as it goes to both ends of the oscillation (see before making variable in FIG. 8). As illustrated in FIG. 7, after making variable of changing the applied voltage in accordance with the oscillation state of the oscillating mirror 9A when applying voltage to the varifocal lens 7A, the beam diameter becomes substantially the same even if it is apart from the oscillation center (see after making variable in FIG. 8).

(Distance Measuring Method Using Scanning Laser Light)

Figure 9:
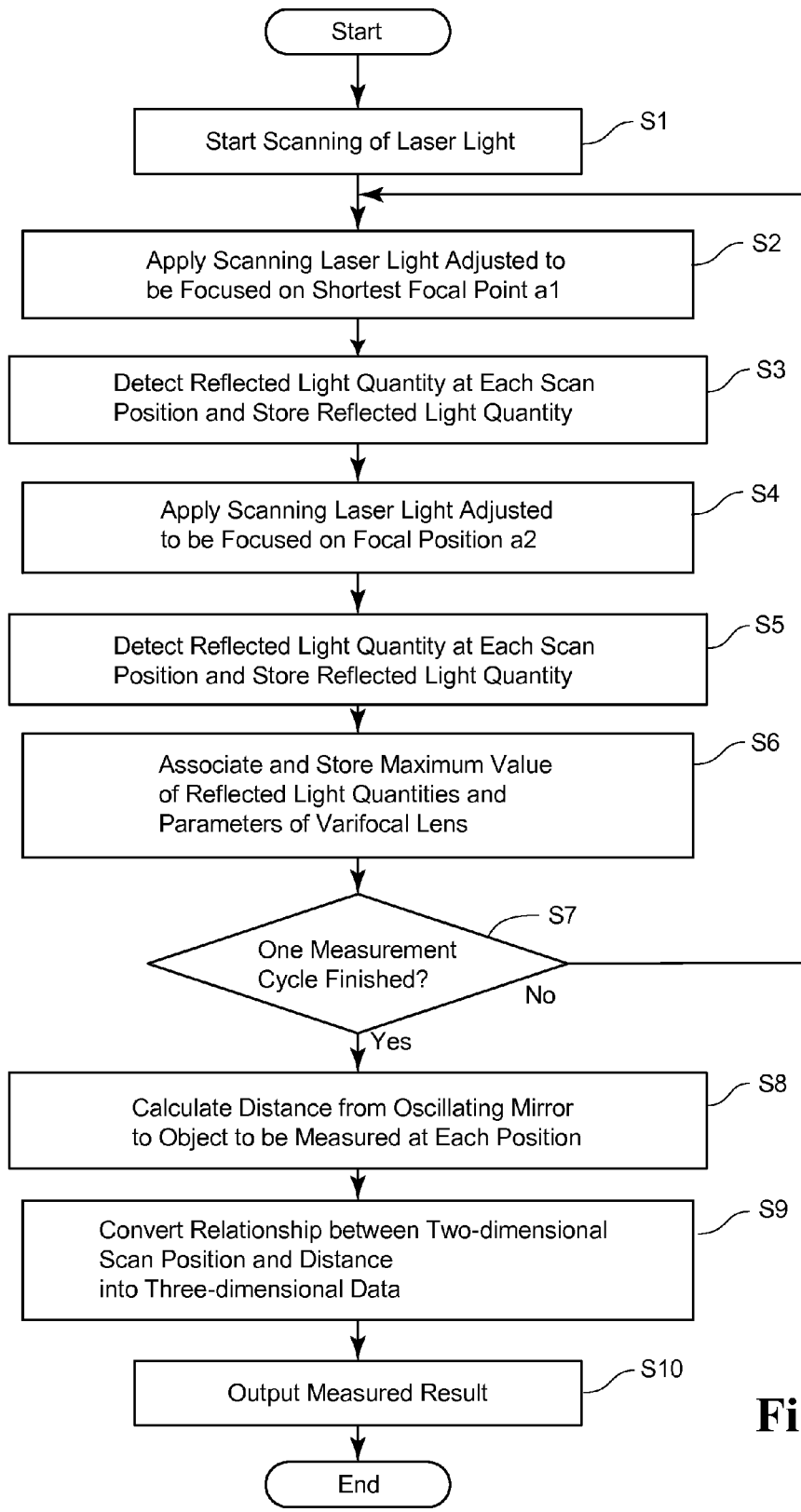
FIG. 9 is a flowchart illustrating main steps of a distance measuring method using laser light according to the embodiment of the present invention.
Figure 10:
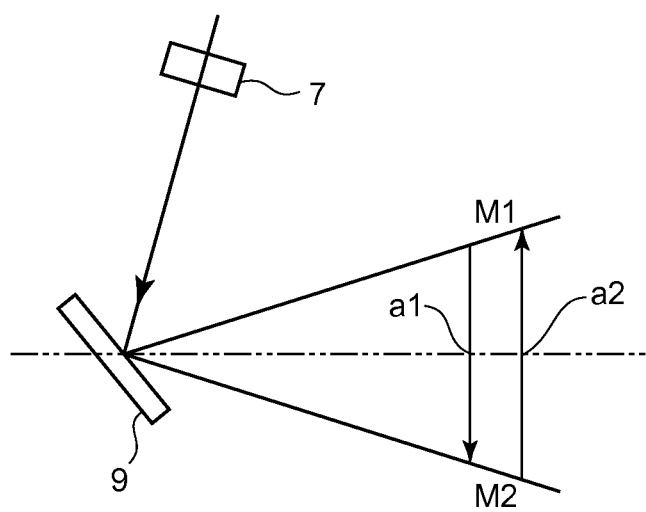
FIG. 10 is an explanatory view schematically illustrating a distance measuring method using laser light according to the embodiment of the present invention.

FIG. 9 is a flowchart illustrating main steps of the distance measuring method using laser light, and FIG. 10 is an explanatory view schematically illustrating the distance measuring method using laser light. The distance measuring method using laser light will be described referring to FIG. 9, FIG. 10.

First, the distance measuring apparatus 1 is activated to start scanning of the laser light (Step S1). Then, in an example illustrated in FIG. 10, the scanning laser light R2 adjusted to be focused on the shortest focal point a1 by adjusting the focal distance of the varifocal lens 7 by the varifocal lens control unit 14 is applied (Step S2). Then, the scanning laser light R2 is scanned in a direction from M1 to M2 illustrated in FIG. 10 or in a direction opposite thereto, and the reflected light quantity at each scan position is detected by the light quantity detector 8 and stored in the light quantity storage unit 16 (Step S3). If no reflected light is detected, "0" is stored. In this example, the focal distance of the varifocal lens 7 is adjusted so that the positions of the focus become a straight line as illustrated in FIG. 10. Since the varifocal lens control unit 14 and the oscillation control unit 15 are synchronized, the scan position can be associated with the detected value of the light quantity at each scan position. Note that for the scanning of the scanning laser light R2, the raster scanning illustrated in FIG. 4 is used, and at the time when the scanning is performed twice from the scanning start position T to the scanning end position E, the flow shifts to the next step.

Next, the scanning laser light R2 adjusted to be focused on a position a2 in a direction farther from the oscillating mirror 9 than is the positional by adjusting the focal distance of the varifocal lens 7 is applied (Step S4). Then, the scanning laser light R2 is scanned through the same scanning trajectory as that for the focal positional, the reflected light quantity at each scan position is detected by the light quantity detector 8 and stored in the light quantity storage unit 16 (Step S5). The movement of the focal distance made from the positional to the position a2 is a predetermined interval.

As described above, the maximum value of the reflected light quantities detected on each scan line and the focal distance parameters of the varifocal lens 7 are associated with each other and stored in the parameter storage unit 17 (Step S6). The parameters of the varifocal lens 7 include the scan position where the maximum value of the light quantity is detected and the value of the voltage applied to the varifocal lens 7 (piezoelectric elements 57) at that time. In the above manner, the scanning of the laser light and the detection of the light quantity of the reflected light are repeated within a range where the focal distance of the varifocal lens 7 is adjustable by changing the distance from the oscillating mirror 9 in a direction farther from the positional, the position a2.

Assuming that the scanning in a measurable range of the object to be measured 4 or an adjustable range of the focal distance of the varifocal lens 7 is one measurement cycle, whether the one measurement cycle has been finished is determined (Step S7), and if it has been finished (YES) is determined, the flow proceeds to the next step. If it has been unfinished (NO) is determined, the scanning and the detection of the reflected light quantity are continued until one measurement cycle is finished.

The calculation unit 18 calculates, at the point in time when the one measurement cycle has been finished, the distance from the oscillating mirror 9 to each measurement portion from the difference in value of the voltage applied to the varifocal lens 7 (piezoelectric elements 57) from that at the moment when the maximum light quantity is detected (Step S8), and the data conversion unit 19 associates the distance with the scan position (two-dimensional position) where the maximum light quantity value has been detected to convert them into three-dimensional data (Step S9). Then, the measured result output interface 20 outputs the measured result (Step S10). For example, associating the actual distance from the oscillating mirror 9 to the position where the scanning laser light R2 is focused with the value of the voltage applied to the varifocal lens 7 (piezoelectric elements 57) corresponding to the distance makes it possible to calculate an absolute distance (actual distance) from the oscillating mirror 9 to the surface of the measurement part 5 where the maximum light quantity value of the reflected light has been detected.

As for the outputting method of the measured result, it is possible to output the measured result as a list of the scan position (detection position of the maximum light quantity) and the distance from the oscillating mirror 9 to the surface of the measurement part 5 at the position, output the measured result after converting it into a three-dimensional image on the basis of the data, or output the measured result after performing data conversion on it to a position where the distance from the oscillating mirror 9 to the surface of the measurement part 5 becomes maximum or minimum.

(Another Distance Measuring Method Using Laser Light)

Figure 11:
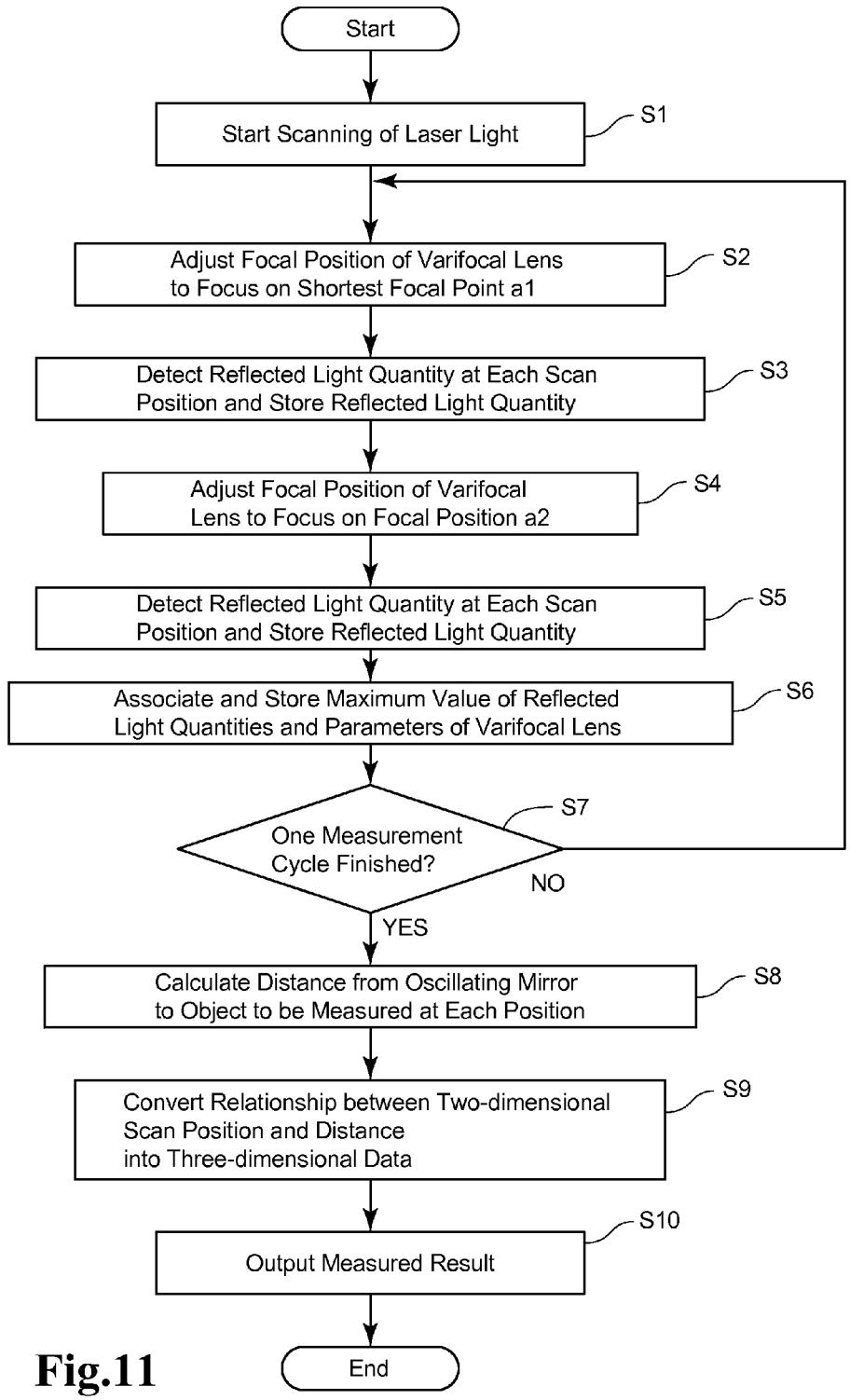
FIG. 11 is a flowchart illustrating main steps of another distance measuring method using laser light according to the embodiment of the present invention.
Figure 12:
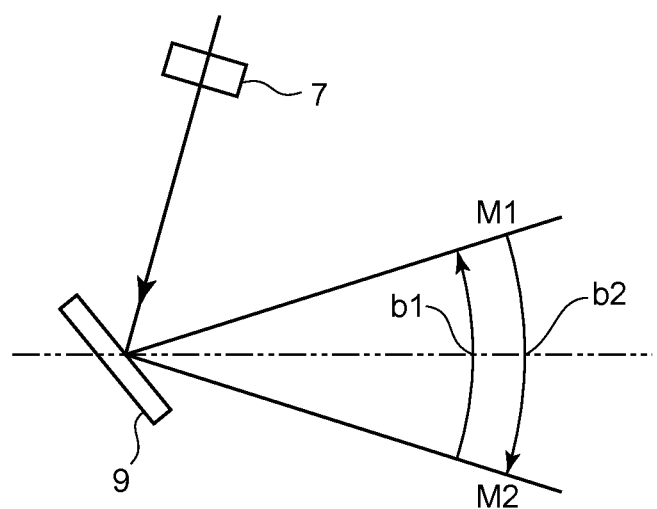
FIG. 12 is an explanatory view schematically illustrating the other distance measuring method using laser light according to the embodiment of the present invention.

Subsequently, another distance measuring method using laser light will be described using FIG. 11 and FIG. 12. FIG. 11 is a flowchart illustrating main steps of the other distance measuring method using laser light. FIG. 12 is an explanatory view schematically illustrating the other distance measuring method using laser light.

First, the distance measuring apparatus 1 is activated to start scanning of the laser light (Step S1). Then, the focal position is adjusted so that the laser light is focused on a shortest focal position b1 (see FIG. 12) (Step S2). Then, the scanning laser light R2 is scanned in a direction from M1 to M2 illustrated in FIG. 12 or in a direction opposite thereto, and the reflected light quantity at each scan position is detected by the light quantity detector 8 and stored in the light quantity storage unit 16 (Step S3). If no reflected light is detected, "0" is stored. In the example illustrated in FIG. 12, the focal distance of the varifocal lens 7 is adjusted so that the positions of the focus become arc-shaped on the scan line. Since the varifocal lens control unit 14 and the oscillation control unit 15 are synchronized, the scan position can be associated with the detected value of the light quantity at each scan position. Note that for the scanning of the scanning laser light R2, the raster scanning illustrated in FIG. 4 is used, and at the time when the scanning is performed twice from the scanning start position T to the scanning end position E, the flow shifts to the next step.

Next, the focal position is adjusted so that the laser light is focused on a position b2 located in a direction farther from the oscillating mirror 9 than is the position b1 by adjusting the focal distance of the varifocal lens 7 (Step S4). Then, the scanning laser light R2 is scanned through the same arc-shaped scanning trajectory as that for the position b1, and the reflected light quantity at each scan position is detected by the light quantity detector 8 and stored in the light quantity storage unit 16 (Step S5).

As described above, the maximum value of the reflected light quantities detected on each scan line and the parameters of the varifocal lens 7 are associated with each other and stored in the parameter storage unit 17 (Step S6). The parameters of the varifocal lens 7 include the scan position where the maximum value of the light quantity is detected and the value of the voltage applied to the varifocal lens 7 (piezoelectric elements 57) at that time. In the above manner, the scanning of the laser light and the detection of the light quantity of the reflected light are repeated within a range where the focal distance of the varifocal lens 7 is adjustable by changing the distance from the oscillating mirror 9 in a direction farther from the position b1, the position b2. After Step S6, the same steps as those in the first example are performed. However, since the scan line is arc-shaped in this example in the distance measuring method, the distance from the oscillating mirror 9 to the position where the laser light is focused is corrected to become equal to the same scan position in the example in which the scan line becomes a straight line illustrated in FIG. 10 outside the central portion of the scanning trajectory.

The distance measuring apparatus 1 using laser light according to the above-described embodiment, two-dimensionally scans the laser light R2 by the oscillating mirror 9 of the light deflecting device 6, adjusts the focal position, by the varifocal lens 7 whose focal position has been controlled, so that the laser light R2 is focused on the surface of the measurement part 5, and measures the distance from the oscillating mirror 9 to the measurement part 5 utilizing the fact that the light quantity of the reflected light from the measurement part 5 becomes maximum at the focal position. The distance measuring apparatus 1 can perform highly precise distance measurement even if the distance from the oscillating mirror 9 to the object to be measured 4 is short as compared with that of the distance measuring apparatus disclosed in JP 2012-141265 A that calculates the distance to the object to be measured using the time difference between the light projection timing from the laser light source and the light receiving timing of the reflected light by the light receiving part. Further, since the distance measuring apparatus 1 does not require the high-precision time measuring apparatus but can be composed of less components, and therefore is easy to downsize.

The distance measuring apparatus 1 using laser light further recognizes the scan position of the scanning laser light by the light deflecting device 6, associates the maximum light quantity value of the reflected light with parameters including the focal distance of the varifocal lens 7 and the voltage applied thereto, and calculates and outputs the distance from the oscillating mirror 9 to the surface of the measurement part 5. Accordingly, it becomes possible to obtain three dimensional information of the two-dimensional scan position and distance.

The distance measuring apparatus 1 using laser light further synchronizes the driving timing of the oscillating mirror 9 and the driving timing of the varifocal lens 7. The relative distance from the oscillating mirror 9 to the measurement part 5 can be calculated from the driving timing of the oscillating mirror 9 (in other words, the scan position of the scanning laser light R2) and the value of the voltage applied to the varifocal lens 7 at the moment when the maximum light quantity of the reflected light R3 is detected. Further, since the driving timing of the oscillating mirror 9 and the driving timing of the varifocal lens 7 are synchronized, the reflected light R3 follows the optical path of the laser light R1 from the laser light source 2 toward the oscillating mirror 9, is branched off by the half mirror 10 and can be received by the light quantity detector 8, so that the outward and inward optical paths become almost the same, thereby enabling downsizing of the optical system.

The distance measuring apparatus 1 using scanning laser light further uses the varifocal lens 7 as the second optical element. The varifocal lens 7 is to vary the focal distance by displacement of the piezoelectric elements 57. The piezoelectric elements 57 are instantaneously displaced in response to voltage application, thereby making it possible to synchronize the driving of the varifocal lens 7 with the driving timing of the oscillating mirror 9.

Further, in the distance measuring apparatus 1 using laser light, the light deflecting device 6 is composed of the oscillating mirror 9 and a MEMS structure (actuator) of an electrostatically driving method that oscillates the oscillating mirror 9. The MEMS structure can be precisely manufactured using a semiconductor manufacturing technique, and can precisely control the scan position of the scanning laser light R2 and is also excellent in responsiveness. Employing the electrostatically driving method as described above enables downsizing, reduction in noise, reduction in power consumption.

The distance measuring apparatus 1 using laser light further includes the half mirror 10 as an optical path branching device that is provided between the oscillating mirror 9 and the first optical element 3 and guides the reflected light R3 to the light quantity detector 8. Most of the reflected light R3 is reflected off the surface of the measurement part 5 and travels following the optical path of the laser light R1 from the laser light source 2 toward the oscillating mirror 9, and only the reflected light R3 is optically branched off by the half mirror 10 disposed in the optical path and is guided to the light quantity detector 8, thereby enabling downsizing of the optical system.

The distance measuring apparatus 1 using laser light has been described above in the embodiment of the present invention, and can be variously implemented without departing from the scope of the present invention. For example, the light emitted from the varifocal lens 7 may be directly scanned without providing the oscillating mirror 9 and so on. Further, the emitted light is laser light but may be other light depending on the kind of the plane to be scanned (surface of a part to be measured). Further, though the laser light is scanned in the above-described embodiment, the distance measuring apparatus 1 is also applicable to a case of not scanning the laser light, such as a case of measuring the distance at a specific point.

Further, the maximum light quantity of the reflected light R3 is detected and the distance from the oscillating mirror 9 to the surface of the measurement part 5 is calculated from the focal distance of the varifocal lens 7 at that time. However, associating the light quantity with the focal distance of the varifocal lens 7 to provide that light quantity enables distance measurement. However, the condition of such a case is that the object to be measured 4 exists at a position farther than the minimum focal distance of the varifocal lens 7. Further, the detection of the maximum light quantity may have a margin within a tolerance range of distance, and the light quantity within this range may be determined to be the maximum light quantity.

Further, the collimator lens is employed as the first optical element 3, but the collimator lens may be omitted or a lens that converts light not to complete collimated light but to almost collimated light may be employed.

Further, the distance measuring apparatus 1 using laser light of the present invention is applicable not only to distance measurement but also to a light-scanning type two-dimensional barcode reader, a laser radar apparatus for vehicle, an apparatus capturing the outer shape of a solid into a three-dimensional image and so on utilizing the detection of the light quantity of the reflected light.

The invention claimed is:

1. A distance measuring apparatus using laser light, comprising:
    a laser light source;
    a first optical element that converts laser light emitted from the laser light source into collimated light;
    a light deflecting device that comprises an oscillatable mirror and scans the laser light on a surface of an object to be measured;
    a second optical element that is arranged between the first optical element and the light deflecting device and converges scanning laser light scanned by the light deflecting device on the surface of the object to be measured;
    a light quantity detector that detects a maximum value of a light quantity of reflected light reflected off the surface of the object to be measured; and
    a controller that controls a scan position of the scanning laser and a focal distance of the second optical element by synchronizing driving timing of the mirror and driving timing of the second optical element are synchronized;
    wherein:
    the controller
    makes the light quantity detector detect a light quantity value of the reflected light in advance or at a time of measurement while the focal distance of the second optical element is being varied, stores the detected light quantity value associated with parameters relating to the scan position of the scanning laser light at that time and the focal distance of the second optical element;
    scans the scanning laser light, detects the maximum value of the light quantity of the reflected light while the focal distance of the second optical element is being varied at each scan position, and calculates a distance from the mirror to the object to be measured using the maximum value of the light quantity and the parameters.

2. The distance measuring apparatus using laser light according to claim 1,
    wherein the second optical element is a varifocal lens whose focal distance varies depending on voltage to be applied thereto.

3. The distance measuring apparatus using laser light according to claim 1,
  wherein the light deflecting device is a MEMS structure of an electrostatically driving method that oscillates the mirror.

4. The distance measuring apparatus using laser light according to claim 1, further comprising:
  an optical path branching device that is provided between the mirror and the first optical element and guides the reflected light to the light quantity detector.

* * * * *